United States Patent
Kwon et al.

(10) Patent No.: US 8,188,980 B2
(45) Date of Patent: May 29, 2012

(54) DEVICE AND METHOD FOR INPUTTING CHARACTERS OR NUMBERS IN MOBILE TERMINAL

(75) Inventors: Sung Kwon, Anyang-si (KR); Jin-Ha Jun, Seoul (KR); Young-Min Won, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1229 days.

(21) Appl. No.: 11/941,645

(22) Filed: Nov. 16, 2007

(65) Prior Publication Data

US 2008/0119238 A1 May 22, 2008

(30) Foreign Application Priority Data

Nov. 16, 2006 (KR) .................. 10-2006-0113272

(51) Int. Cl.
*G09G 5/00* (2006.01)
(52) U.S. Cl. ......... 345/173; 345/156; 715/780; 715/863
(58) Field of Classification Search .......... 345/156–173; 715/780, 789, 856, 863; 341/22–35
See application file for complete search history.

(56) References Cited

U.S. PATENT DOCUMENTS

| 6,011,542 | A | 1/2000 | Durrani et al. | |
|---|---|---|---|---|
| 7,385,592 | B2* | 6/2008 | Collins | 345/173 |
| 2003/0197736 | A1* | 10/2003 | Murphy | 345/780 |
| 2006/0026535 | A1* | 2/2006 | Hotelling et al. | 715/863 |

FOREIGN PATENT DOCUMENTS

| DE | 102 42 378 | 3/2004 |
|---|---|---|
| KR | 10-0162189 | 1/1999 |
| KR | 1020020065059 | 8/2002 |

\* cited by examiner

*Primary Examiner* — Regina Liang
(74) *Attorney, Agent, or Firm* — The Farrell Law Firm, P.C.

(57) ABSTRACT

A device for inputting characters or numbers in a mobile terminal having a touch screen, the device including a display screen for displaying characters or numbers at a display area and a wheel for selecting a desired character or number at another display area in a text input mode; and a control unit for controlling the display screen to display the characters or numbers and the wheel for selecting a desired character or number at the display areas, placing a cursor on a character or number corresponding to rotation of the wheel, and controlling the display screen to display a character or number selected by placing the cursor.

24 Claims, 5 Drawing Sheets

DEVICE AND METHOD FOR INPUTTING CHARACTERS OR NUMBERS IN MOBILE TERMINAL

PRIORITY

This application claims priority under 35 U.S.C. §119(a) to an application filed in the Korean Industrial Property Office on Nov. 16, 2006 and assigned Ser. No. 2006-113272, the contents of which are incorporated herein by reference.

BACKGROUND OF THE INVENTION

1. Field of the Invention

The present invention generally relates to a mobile terminal, and more particularly to a method for inputting characters or numbers using a touch screen provided on a mobile terminal.

2. Description of the Related Art

Mobile terminals generally refer to handheld devices used for data transmissions or wireless communications. These devices include cellular phones, Personal Digital Assistants (PDAs), Personal Communication Services (PCS) phones, International Mobile Telecommunication-2000 (IMT-2000) terminals and Global System for Mobile Communication (GSM) terminals.

Mobile terminals have attained worldwide popularity as a necessity for people of all ages. Mobile terminals are now becoming smaller, sleeker and lighter to improve portability, and are also implementing various multimedia functions and services.

In particular, mobile terminals are changing to become multifunctional, multipurpose and multimedia devices. Mobile terminals are expected to be modified to meet various multimedia and Internet environments.

Among a diversity of additional functions available in mobile terminals, Short Message Service (SMS) is a tremendously popular function, which allows mobile users to send or receive text messages. Early stage SMS enabled users to input only alphabetic characters or numbers. However, symbols and special characters can now also be input in SMS messages.

In order to input an SMS message in a mobile terminal provided with a touch screen, a user has to touch every required character on the touch screen. It is cumbersome to repeatedly touch a touch screen. Also, frequent finger touches can damage a touch screen.

In addition, as size of mobile terminals becomes smaller, a limitation is occurring in displaying all characters or numbers on one touch screen.

SUMMARY OF THE INVENTION

Accordingly, the present invention solves the above-mentioned problems occurring in the prior art, and the present invention provides a device and a method for inputting characters or numbers using a virtual wheel created in software on a touch screen of a mobile terminal.

In accordance with an aspect of the present invention, there is provided a device for inputting characters/numbers in a mobile terminal having a touch screen, the device including a display screen for displaying characters/numbers at a display area and a wheel for selecting a desired character/number at another display area in a text input mode; and a control unit for controlling the display screen to display the characters/numbers and the wheel for selecting a desired character/number at the display areas, placing a cursor on a character/number corresponding to rotation of the wheel, and controlling the display screen to display a character/number selected by placing the cursor.

In accordance with another aspect of the present invention, there is provided a device for inputting characters/numbers in a mobile terminal having a touch screen, the device including a display screen for displaying characters/numbers at a display area and at least two wheels for selecting a desired character/number at another area in a text input mode; and a control unit for detecting rotation of any one of the two wheels in the text input mode, placing a cursor on a character/number corresponding to the rotation of the wheel, and controlling the display screen to display a character/number selected by placing the cursor.

In accordance with still another aspect of the present invention, there is provided a method for inputting characters/numbers in a mobile terminal having a touch screen, the method including displaying characters/numbers at a display area and a wheel for selecting a desired character/number at another display area when a current mode of the mobile terminal is changed to a text input mode; moving a cursor with rotation of the wheel and placing the cursor on a character/number corresponding to the rotation of the wheel; and displaying a character/number selected by placing the cursor.

In accordance with yet another aspect of the present invention, there is provided a method for inputting characters/numbers in a mobile terminal having a touch screen, the method including displaying characters/numbers at a display area and at least two wheels for selecting a desired character/number at another area when a current mode of the mobile terminal is changed to a text input mode; moving a cursor with rotation of one of the two wheels and placing the cursor on a character/number corresponding to the rotation of the wheel; and displaying a character/number selected by placing the cursor.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
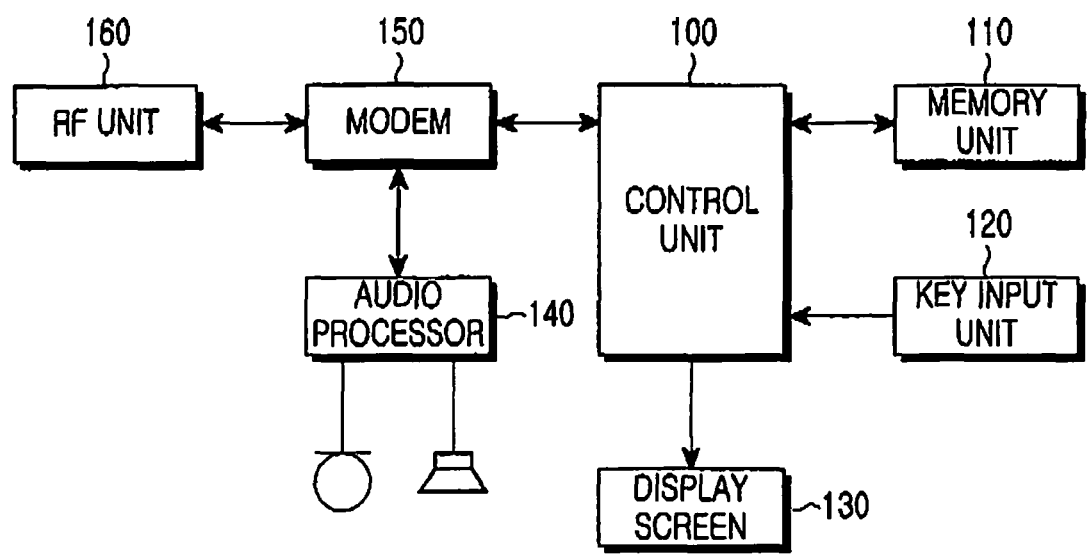
FIG. 1 is a block diagram of a mobile terminal having a touch screen according to the present invention.

Preferred embodiments of the present invention will be described with reference to the accompanying drawings. In the following description, the same elements will be designated by the same reference numerals although they are shown in different drawings. Also, in the following description of the present invention, descriptions of known functions and configurations incorporated herein will be omitted when it may make the subject matter of the present invention rather unclear.

FIG. 1 shows a mobile terminal having a touch screen according to the present invention. The mobile terminal shown in FIG. 1 includes a control unit 100, a memory 110, a key input unit 120, a display screen 130, an audio processor 140, a modem 150 and a Radio Frequency (RF) unit 160.

The memory 110 may be composed of a program memory and a data memory. The memory 110 stores programs for controlling the operations of the mobile terminal and various information selected by the user. The memory 110 also stores character/number data necessary to input characters or numbers. The memory 110 preferably includes a Read Only Memory (ROM) for storing operation processes accessible through the control unit 100 for general operations of the mobile terminal and a Random Access Memory (RAM) for storing data according to the control instructions during data processing. However, the memory 110 may be alternatively configured according to desires of a user.

The audio processor 140 converts an electrical signal input from a microphone into audio data, and demodulates encoded audio data input from the RF unit 160 into an electrical signal which will be output through a speaker. The audio processor 140 preferably includes a coder/decoder (codec) to convert a digital audio signal received through the RF unit 160 into an analog audio signal and to convert an analog audio signal generated from the microphone into a digital audio signal. The codec may include a data codec for processing packet data and an audio codec for processing an audio signal, such as a speech signal. Also, the codec may be provided as an independent element or may be included in the control unit 100.

The modem 150 includes a transmitter for coding and modulating a signal which will be transmitted and a receiver for demodulating and decoding a received signal.

The RF unit 160 receives or transmits audio, text, image and control data under the control of the control unit 100. The RF unit 160 includes an RF transmitter for performing upward conversion and amplification of the frequency of a transmitted signal and an RF receiver for amplifying a received signal with low noise and performing downward conversion of the frequency of the signal.

The key input unit 120 is provided with alphanumeric keys used to input numbers or characters and function keys used to set various functions.

The display screen 130 may include a Liquid Crystal Display (LCD) or Organic Light Emitting Diodes (OLED). The display screen 130 displays various data generated in the mobile terminal 100. When an LCD is a touch screen, the LCD can serve as an input means together with the key input unit 120.

According to the present invention, the display screen 130 is composed of a first display area for displaying characters or numbers in a text input mode, a second display area for displaying at least one wheel for selecting a desired character or number from those displayed in the first display area, a third display area for displaying the character or number selected using the at least one wheel, and a fourth display area for displaying the selected character or number according to a selection of a user to input the same.

According to another example of the present invention, at least two wheels are displayed in the second display area in a text input mode.

The control unit 100 controls the overall operations of the mobile terminal. When a text input mode is implemented in the mobile terminal, the display screen 130 displays the first through fourth display areas under the control of the control unit 100. According to the present invention, when a finger touches and rotates the virtual wheel displayed in the second display area, the control unit 100 moves a cursor over the characters or numbers displayed in the first display area, and places the cursor on a character or number corresponding to a direction and angle of rotation of the wheel.

According to another example of the present invention, when the wheel is rotated in a first direction (e.g. clockwise or counterclockwise), the control unit 100 moves the cursor over only the characters or numbers corresponding to a first direction of rotation, and places the cursor on a character or number corresponding to an angle of rotation of the wheel. When the wheel is rotated in a second direction (e.g. clockwise or counterclockwise), the control unit 100 moves the cursor over only the characters or number corresponding to a second direction of rotation, and places the cursor on a character or number corresponding to an angle of rotation of the wheel.

According to another example of the present invention, first and second wheels are displayed in the second display area of the display screen 130. When the user rotates any of the first and second wheels, the control unit 100 moves the cursor over only the characters or numbers corresponding to the rotated wheel, and places the cursor on a character or number corresponding to a direction and angle of rotation of the wheel.

When the cursor is placed on a specific character or number, the control unit 100 displays the character or number in the third display area. When the user selects an input of that character or number, the control unit 100 then displays the selected character or number in the fourth display area.

Figure 2:
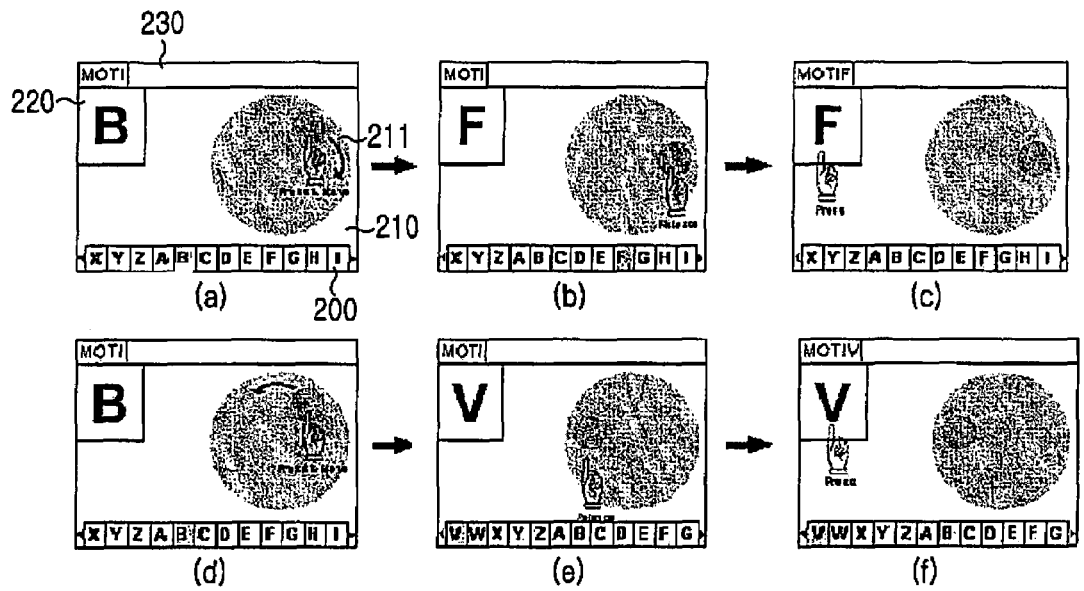
FIG. 2 is a view showing a touch screen for inputting characters or numbers in a mobile terminal according to a first embodiment of the present invention.

FIG. 2 shows an example of a touch screen for inputting characters or numbers in a mobile terminal according to the present invention. When a text input mode is implemented in the mobile terminal, the display screen 130 displays a first display area 200, second display area 210, third display area 220, and fourth display area 230, as illustrated in diagram (a) of FIG. 2, under the control of the control unit 100. When a finger touches and rotates a virtual wheel 211 displayed in the second display area 210 in a first direction, as illustrated in diagram (a) of FIG. 2, the control unit 100 moves the cursor over characters or numbers displayed in the first display area 200 in a corresponding (e.g. right) direction, and places the cursor on a character or number corresponding to an angle of rotation of the wheel 211. Diagram (a) of FIG. 2 shows that the cursor is placed on an alphabetic character "B." With the rotation of the wheel 211 in the first direction, the cursor moves right over the characters in the first display area 200. Diagram (b) of FIG. 2 shows that the cursor is moved and placed on an alphabetic character "F" with the release of the finger. The alphabetic character "F" is then displayed in the third display area 220.

When the user touches the third display area 220, as illustrated in diagram (c) of FIG. 2, the control unit 100 recognizes that the character displayed in the third display area 220 is selected to be input. Accordingly, the control unit 100 displays the same character in the fourth display area 230. In summary, the character "F" with the cursor placed thereon is displayed in the third display area 220. The same character is displayed in the fourth display area 230 with a finger touch on the third display area 220.

According to the present invention, a character or number selected by placing the cursor is displayed in the third display area 220, and will be subsequently displayed in the fourth display area 230 if the user touches the third display area 220 to input the same. According to another example of the present invention, a character or number selected by placing the cursor can be displayed in the fourth display area 230 with a double-touch of the wheel 211 in the second display area 210. It is also possible to provide a separate key for inputting a character or number displayed in the third display area 220.

As explained above, the user can easily select and input a desired character or number using the virtual scroll wheel 211 created on the display screen 130.

Figure 3:
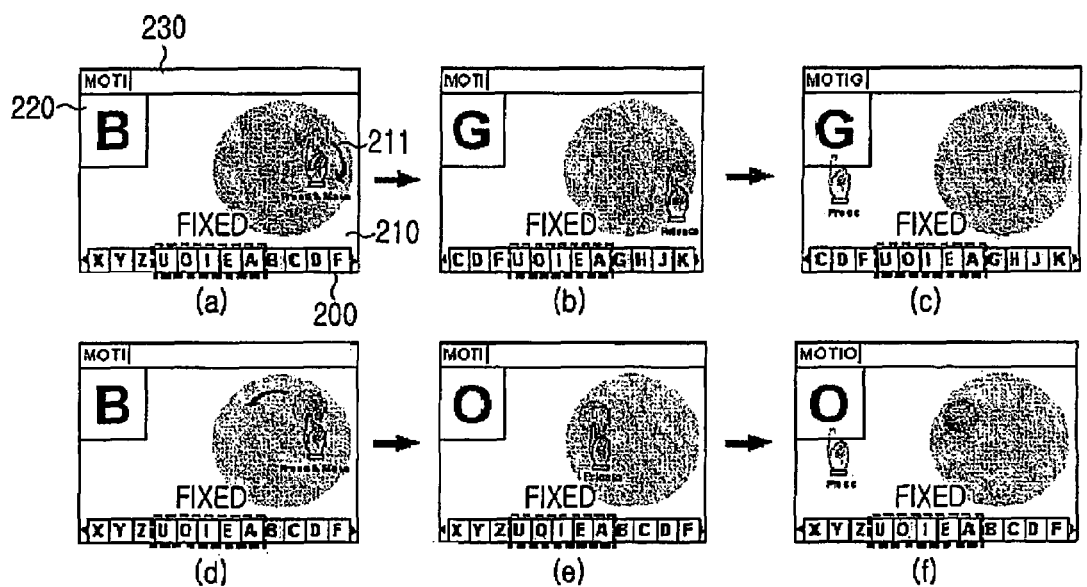
FIG. 3 is a view showing a touch screen for inputting characters or numbers in a mobile terminal according to a second embodiment of the present invention.
Figure 5:
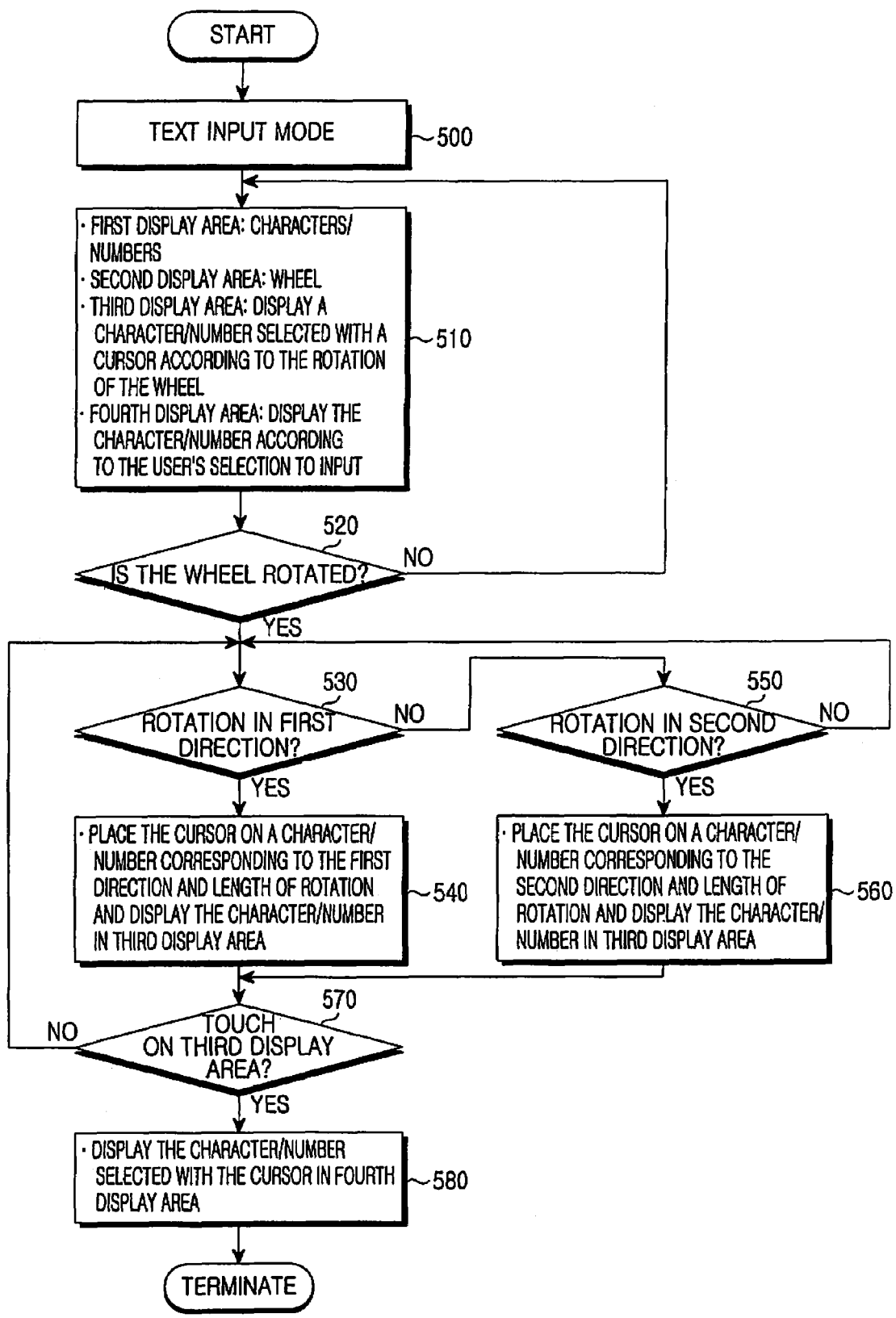
FIG. 5 is a flowchart showing a process of inputting characters or numbers in a mobile terminal according to the second embodiment of the present invention.

FIG. 3 shows another example of a touch screen for inputting characters or numbers in a mobile terminal according to the present invention. FIG. 5 shows a process of inputting characters or numbers in a mobile terminal with the touch screen shown in FIG. 3.

Referring to FIGS. 1, 3 and 5, the control unit 100 detects when the current mode of the mobile terminal is changed to the text input mode in step 500.

Upon implementation of the text input mode, the control unit 100 proceeds to step 510 in order to display the first display area 200 through the fourth display area 230 at portions of the display screen 130, as illustrated in diagram (a) of FIG. 3.

Characters or numbers displayed in the first display area 200 can be classified into those corresponding to a first direction of rotation of the wheel and those corresponding to a second direction of rotation of the wheel. For example, consonants of the English alphabet can be set to be selectable with the wheel rotation in the first direction, and vowels can be set to be selectable with the wheel rotation in the second direction. Characters or numbers (for example, vowels) can also be set corresponding to the second direction to be fixedly displayed in the first display area 200.

During the display of diagram (a) of FIG. 3, the control unit 100 determines whether the wheel 211 is rotated in step 520. Upon detecting rotation of the wheel 211, the control unit 100 determines direction of the rotation in step 530.

When the control unit 100 determines that the wheel 211 is rotated in a first direction in step 530, the control unit 100 will proceed to step 540 in order to move the cursor over the characters or numbers (for example, consonants of the English alphabet) corresponding to the first direction, place the cursor on a character or number corresponding to an angle of rotation of the wheel 211, and display the character or number with the cursor on the third display area 220, as illustrated in diagram (b) of FIG. 3. Diagram (b) of FIG. 3 shows that a consonant "G" is selected with the wheel rotation in the first direction and displayed in the third display area 220.

In step 570, the control unit 100 determines whether a finger touches the third display area 220 for the input of the displayed character. Upon detecting a finger touch, the control unit 100 proceeds to step 580 in order to input and display the character in the fourth display area 230.

If the wheel 211 is not rotated in the first direction in step 530, the control unit 100 will proceed to step 550 in order to determine whether the wheel 211 is rotated in a second direction. Upon detecting rotation in the second direction, the control unit 100 will proceed to step 560 in order to move the cursor over characters or numbers (for example, vowels of the English alphabet) corresponding to the second direction, place the cursor on a character or number corresponding to an angle of rotation of the wheel 211, and display the character or number with the cursor on the third display area 220, as illustrated in diagram (e) of FIG. 3. Diagram (e) of FIG. 3 shows that a vowel "O" is selected with the wheel rotation in the second direction and displayed in the third display area 220.

When the user touches the wheel 211 twice consecutively or the third display area 220 once, the control unit 100 recognizes such a double or one touch as an input key for inputting the character or number selected by placing the cursor, and thereby displays the same character or number in the fourth display area 230.

It is possible to set some characters or numbers to be selectable with the rotation of the wheel 211 in the first direction and others to be selectable with the wheel rotation in the second direction. Preferably, vowels or special characters/symbols frequently used during the input of a text message are set to be selectable with the wheel rotation in a specific direction, which enables the user to more easily and rapidly input the frequently used characters.

Figure 4:
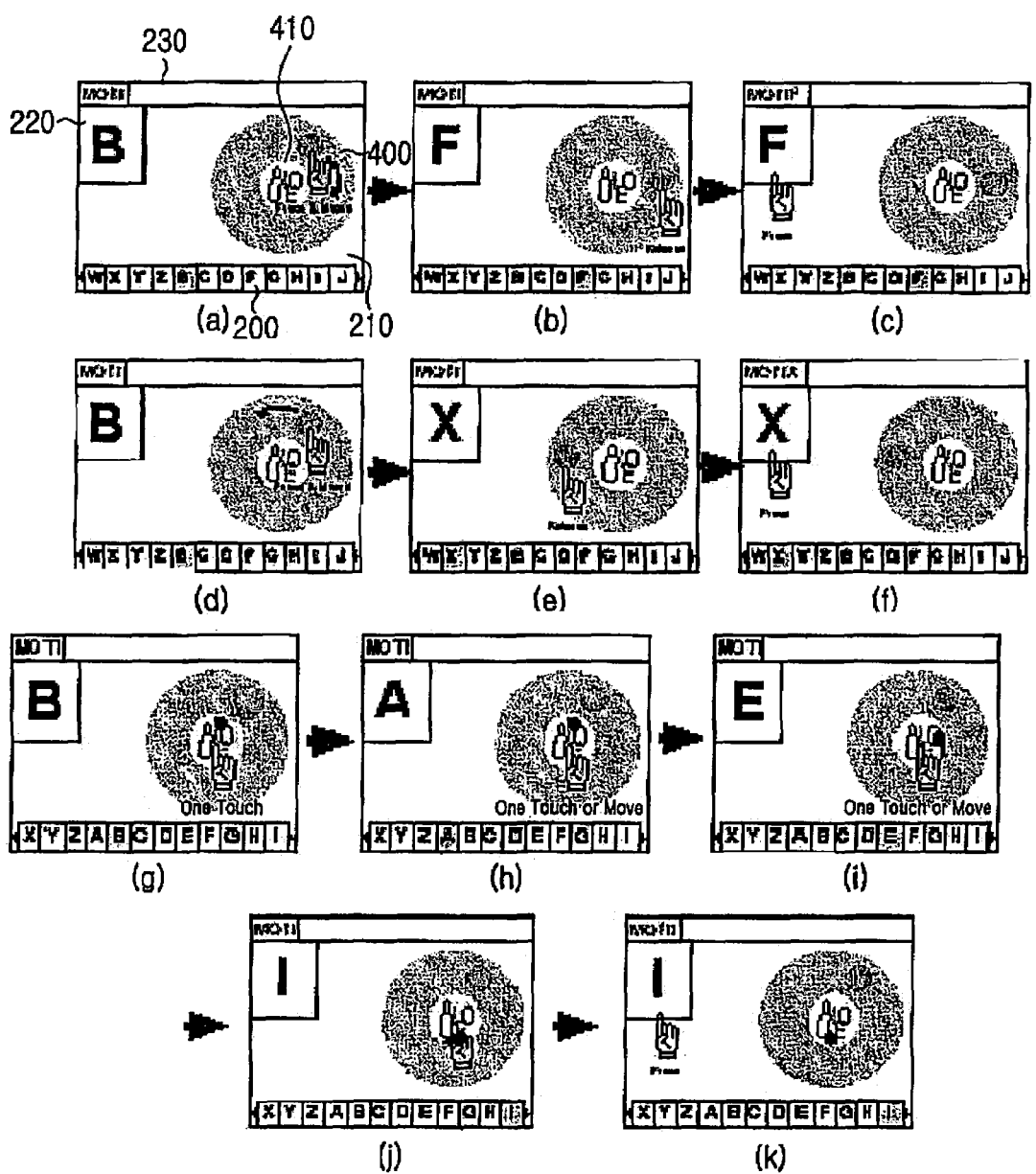
FIG. 4 is a view showing a touch screen for inputting characters or numbers in a mobile terminal according to a third embodiment of the present invention.
Figure 6:
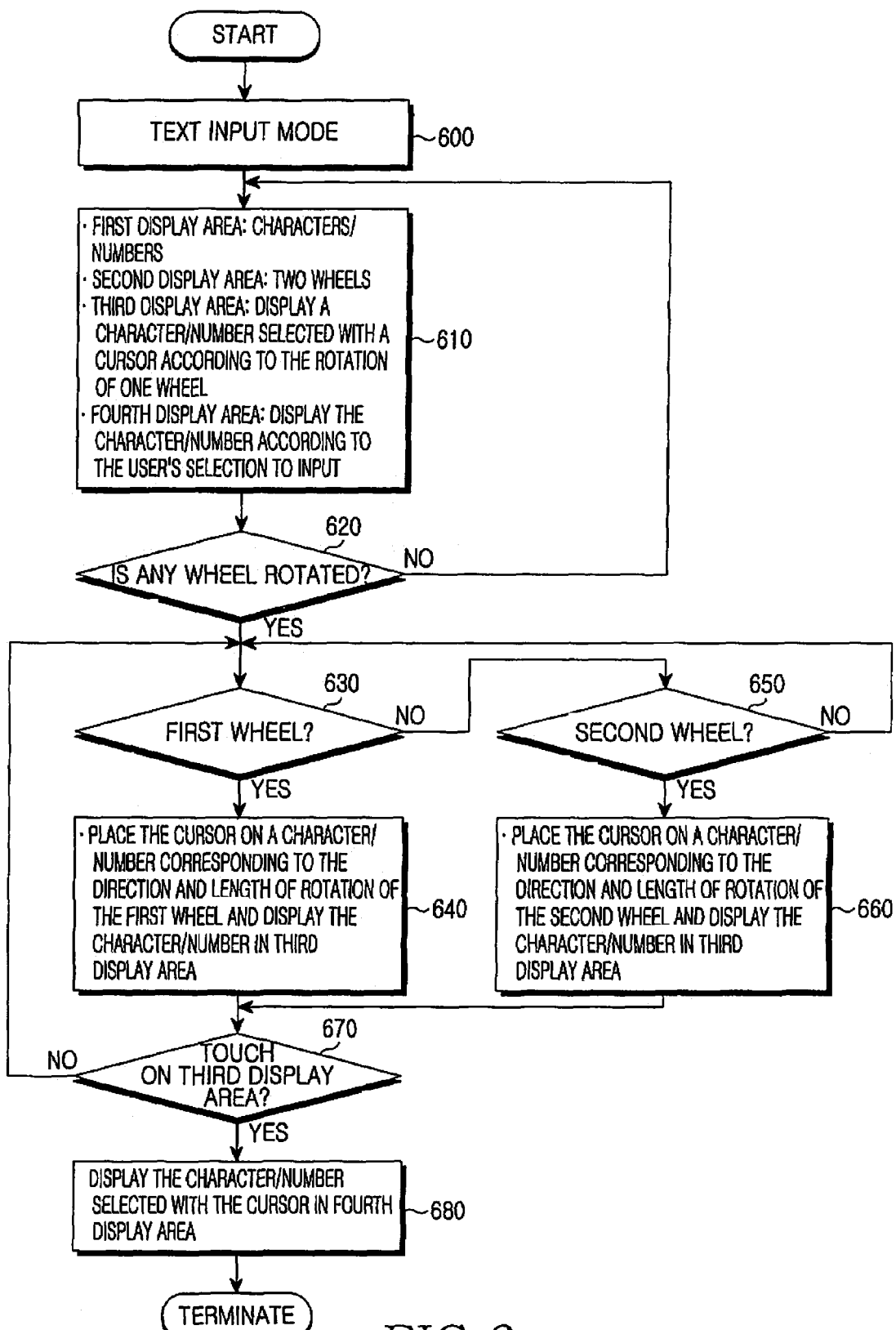
FIG. 6 is a flowchart showing a process of inputting characters or numbers in a mobile terminal according to the third embodiment of the present invention.

FIG. 4 shows another example of a touch screen for inputting characters or numbers in a mobile terminal according to the present invention. FIG. 6 shows a process of inputting characters or numbers in a mobile terminal with the touch screen shown in FIG. 4.

Referring to FIGS. 1, 4 and 6, the control unit 100 detects when the current mode of the mobile terminal is changed to the text input mode in step 600.

Upon implementation of the text input mode, the control unit 100 proceeds to step 610 in order to divide the display screen 130 into the first display area 200 for displaying selectable characters or numbers, the second display area 210 for displaying at least two wheels for selecting a desired character or number, the third display area 220 for displaying the character or number selected using any wheel, and the fourth display area 230 for displaying the selected character or number according to a selection of a user to input the same.

During the display of the first to fourth display areas 200 to 230, the control unit 100 determines whether any of the two wheels are rotated in step 620. Upon detecting rotation of a wheel, the control unit 100 determines which wheel is being rotated in step 630.

If a first wheel 400 is being rotated, the control unit 100 will proceed to step 640 in order to move the cursor over characters or numbers corresponding to a direction of rotation of the first wheel 400, place the cursor on a character or number corresponding to an angle of rotation of the first wheel 400, and display the character or number with the cursor on the third display area 220.

If the first wheel 400 is not being rotated in step 630, the control unit 100 will then proceed to step 650 in order to determine whether a second wheel 410 is being rotated.

If the second wheel 410 is being rotated, the control unit 100 will proceed to step 660 in order to move the cursor over characters or numbers corresponding to a direction of rotation of the second wheel 410, place the cursor on a character or number corresponding to an angle of rotation of the second wheel 410, and display the character or number with the cursor in the third display area 220.

While a character or number selected by placing the cursor is displayed in the third display area 220 in step 640 or 660, the control unit 100 determines whether a finger touches the third display area 220 for the input of the displayed character or number in step 670.

Upon detecting a finger touch in step 670, the control unit 100 proceeds to step 680 in order to input and display the character or number in the fourth display area 230.

Referring to FIG. 4, it is assumed that consonants of the English alphabet are set to be selectable with rotation of the first wheel 400, and vowels are set to be selectable with rotation of the second wheel 410.

Diagram (a) of FIG. 4 shows that the first wheel 400 is rotated in the first direction. When the first wheel 400 is rotated in a first direction, the control unit 100 moves the cursor over only the consonants of the English alphabet corresponding to the first direction as previously set, and places the cursor on a consonant "F" corresponding to an angle of rotation, as illustrated in diagram (b) of FIG. 4.

When the first wheel 400 is rotated in a second direction as illustrated in diagram (d) of FIG. 4, the control unit 100 moves the cursor over only the consonants corresponding to the second direction, and places the cursor on a consonant "X" corresponding to an angle of rotation as illustrated in diagram (e) of FIG. 4. Subsequently, when the user touches the third display area 220, as illustrated in diagrams (c) or (f) of FIG. 4, the control unit 100 recognizes the touch as an input key and displays the consonant "F" or "X" with the cursor placed thereon in the fourth display area 230.

Diagrams (g) through (k) of FIG. 4 show the input of a desired vowel using the second wheel 410. The user can move the cursor to a desired vowel with rotation of the second wheel 410 or with touch or touches on the second wheel 410.

If the user touches the second wheel 410 once while the cursor is placed on a consonant as illustrated in diagram (g) of FIG. 4, the control unit 100 will move the cursor to a first vowel "A" in the English alphabet, which corresponds to one touch on the second wheel 410, as illustrated in diagram (h) of FIG. 4. In other words, the control unit 100 detects a one-touch on the second wheel 410 while the cursor is placed on a consonant, and then places the cursor on the first vowel "A" in the English alphabet. If the user touches the second wheel 410 twice consecutively, the control unit 100 will place the cursor on a second vowel "E" in the English alphabet. If the user touches the second wheel 410 three times consecutively, the control unit 100 will then place the cursor on a third vowel "I" in the English alphabet.

If the user rotates the second wheel 410 in the first direction while the cursor is placed on a consonant "B", as illustrated in diagram (g) of FIG. 4, the control unit 100 will move the cursor to a vowel corresponding to the first direction and angle of rotation of the second wheel 410.

Upon detecting a one-touch on the second wheel 410 during the display of diagram (g) of FIG. 4, the control unit 100 moves the cursor to the first vowel "A" and displays the vowel "A" in the third display area 220, as illustrated in diagram (h) of FIG. 4. If the control unit 100 subsequently detects rotation of the second wheel 410 or one additional touch on the second wheel 410, the control unit 100 will move the cursor to the second vowel "E" corresponding to the rotation or one additional touch of the second wheel 410, and will display the vowel "E" in the third display area 220, as illustrated in diagram (i) of FIG. 4.

If the control unit 100 detects the rotation of the second wheel 410 or one additional touch on the second wheel 410 during the display of the vowel "E" in the third display area 220, as illustrated in diagram (i) of FIG. 4, the control unit 100 will move the cursor to the third vowel "I" corresponding to the rotation or one additional touch of the second wheel 410, and will display the vowel "I" in the third display area 220, as illustrated in diagram (j) of FIG. 4. If the control unit 100 detects a touch on the third display area 220 during the display of the vowel "I," the control unit 100 will recognize the touch as an input key for inputting the vowel "I" and thereby display the vowel "I" in the fourth display area 230.

As explained above, it is possible to assign different types of characters to at least two wheels so that each type of characters can be selected using a corresponding wheel, which enables the user to more easily and rapidly select and input a desired character.

It is also possible to assign characters frequently used during the input of a text message to the first wheel 400 or the second wheel 410 so the user can easily and rapidly select those characters.

The present invention enables a user to easily input characters or numbers using one or more virtual wheels created in software on a display screen of a mobile terminal. According to the present invention, vowels or frequently used characters/numbers/symbols can be set to be fixedly displayed in a first display area, thereby enhancing convenience of a user in inputting characters or numbers.

A user can select and input a desired character or number using one or more virtual wheels displayed on a display screen. Frequently used characters or numbers can be set to be fixedly displayed on a specific area of the display screen, and can be set to be selectable with rotation of a wheel.

While the invention has been shown and described with reference to certain preferred embodiments thereof, it will be understood by those skilled in the art that various changes in form and details may be made therein without departing from the spirit and scope of the invention as defined by the appended claims. For example, characters, numbers or symbols used over a number of times during the input of a text message can be automatically set to be fixedly displayed at a portion of the first display area.

What is claimed is:

1. A device for inputting characters/numbers in a mobile terminal having a touch screen, the device comprising:
  a display screen for displaying characters/numbers at a first display area and a wheel for selecting a desired character/number at a second display area in a text input mode; and
  a control unit for controlling the display screen to display the characters/numbers and the wheel for selecting a desired character/number at the display areas, placing a cursor on a character/number corresponding to rotation of the wheel, and controlling the display screen to display a character/number selected by placing the cursor, wherein said control unit displays the character/number selected by placing the cursor according to a direction of rotation of the wheel in a third display area, detects when a user selects an input of the character/number displayed in the third display area, and displays a character/number in a fourth display area according to a selection of the user to input.

2. The device according to claim 1, wherein said display screen includes the first display area for displaying characters/numbers in a text input mode, the second display area for displaying a wheel for selecting a desired character/number from those displayed in the first display area, the third display area for displaying the character/number selected using the wheel, and the fourth display area for displaying the selected character/number according to the selection of the user to input the same.

3. The device according to claim 1, wherein said control unit displays the first display area to the fourth display area on the display screen in the text input mode, detects when the wheel is rotated in a first direction, controls a cursor to move over only characters/numbers corresponding to the first direction in the first display area and be placed on a character/number corresponding to the first direction and angle of rotation of the wheel, detects when the wheel is rotated in a second direction, and controls the cursor to move over only characters/numbers corresponding to the second direction in the first display area and be placed on a character/number corresponding to the second direction and angle of rotation of the wheel.

4. The device according to claim 3, wherein said characters/numbers displayed in the first display area include a first type of characters/numbers, over which the cursor moves with rotation of the wheel in the first direction, and a second type of characters/numbers, over which the cursor moves with rotation of the wheel in the second direction.

5. The device according to claim 4, wherein said first type of characters/numbers is one of a group of consonants/vowels of an alphabet and a group of characters/numbers frequently used over a number of times during input of a text message.

6. The device according to claim 4, wherein said second type of characters/numbers is one of a group of consonants/vowels of an alphabet and a group of characters/numbers frequently used over a number of times during input of a text message.

7. A device for inputting characters/numbers in a mobile terminal having a touch screen, the device comprising:
a display screen for displaying characters/numbers at a first display area and at least two wheels for selecting a desired character/number at a second display area in a text input mode; and
a control unit for detecting rotation of any one of the at least two wheels in the text input mode, placing a cursor on a character/number corresponding to the rotation of the one wheel, and controlling the display screen to display a character/number selected by placing the cursor,
wherein said control unit displays the character/number selected by placing the cursor according to a direction of rotation of the wheel in a third display area, detects when a user selects an input of the character/number displayed in the third display area, and displays a character/number in a fourth display area according to a selection of the user to input.

8. The device according to claim 7, wherein said display screen includes the first display area for displaying characters/numbers in a text input mode, the second display area for displaying at least two wheels for selecting a desired character/number from those displayed in the first display area, the third display area for displaying the character/number selected using at least one wheel, and the fourth display area for displaying the selected character/number according to the selection of the user to input the same.

9. The device according to claim 7, wherein said control unit displays the first display area to the fourth display area on the display screen in the text input mode, detects a rotation of a first wheel, controls a cursor to move over only characters/numbers corresponding to the first wheel in the first display area and be placed on a character/number corresponding to an angle of rotation of the first wheel, detects a rotation of a second wheel, controls the cursor to move over only characters/numbers corresponding to the second wheel and be placed on a character/number corresponding to an angle of rotation of the second wheel.

10. The device according to claim 9, wherein said characters/numbers displayed in the first display area include a first type of characters/numbers, over which the cursor moves with rotation of the first wheel, and a second type of characters/numbers, over which the cursor moves with rotation of the second wheel.

11. The device according to claim 10, wherein said first type of characters/numbers is one of a group of consonants/vowels of an alphabet and a group of characters/numbers frequently used over a number of times during input of a text message.

12. The device according to claim 10, wherein said second type of characters/numbers is one of a group of consonants/vowels of an alphabet and a group of characters/numbers frequently used over a number of times during input of a text message.

13. A method for inputting characters/numbers in a mobile terminal having a touch screen, the method comprising:
displaying characters/numbers at a first display area of a display screen and a wheel for selecting a desired character/number at a second display area when a current mode of the mobile terminal is changed to a text input mode;
moving a cursor with rotation of the wheel and placing the cursor on a character/number corresponding to the rotation of the wheel;
displaying a character/number with the cursor placed thereon in a third display area; and
displaying a character/number in a fourth display area according to a selection of a user to input the same.

14. The method according to claim 13, further comprising providing the display screen with the first display area for displaying characters/numbers in a text input mode, the second display area for displaying a wheel for selecting a desired character/number from those displayed in the first display area, the third display area for displaying a character/number selected using the wheel, and the fourth display area for displaying a selected character/number according to the selection of the user to input the same.

15. The method according to claim 14, further comprising providing characters/numbers displayed in the first display area as a first type of characters/numbers, over which the cursor moves with rotation of the wheel in a first direction, and a second type of characters/numbers, over which the cursor moves with rotation of the wheel in a second direction.

16. The method according to claim 13, wherein the moving a cursor step comprises:
detecting rotation of the wheel in a first direction, moving the cursor over characters/numbers corresponding to the first direction in the first display area, and placing the cursor on a character/number corresponding to an angle of rotation of the wheel;
detecting rotation of the wheel in a second direction, moving the cursor over the characters/numbers corresponding to the second direction in the first display area, and placing the cursor on a character/number corresponding to an angle of rotation of the wheel.

17. The method according to claim 16, further comprising providing the characters/numbers corresponding to the first direction as one of a group of consonants/vowels of an alphabet and a group of characters/numbers frequently used over a number of times during input of a text message.

18. The method according to claim 16, further comprising providing the characters/numbers corresponding to the second direction as one of a group of consonants/vowels of an alphabet and a group of characters/numbers frequently used over a number of times during input of a text message.

19. A method for inputting characters/numbers in a mobile terminal having a touch screen, the method comprising:
displaying characters/numbers at a first display area of a display screen and at least two wheels for selecting a desired character/number at a second display area when a current mode of the mobile terminal is changed to a text input mode;
moving a cursor with rotation of at least one of the at least two wheels and placing the cursor on a character/number corresponding to the rotation of the one wheel;

displaying a character/number with the cursor placed thereon in a third display area: and displaying a character/number in a fourth display area according to a selection of a user to input the same.

20. The method according to claim 19, further comprising providing the display screen with the first display area for displaying characters/numbers in a text input mode, the second display area for displaying at least two wheels for selecting a desired character/number from those displayed in the first display area, the third display area for displaying a character/number selected using one wheel, and the fourth display area for displaying a selected character/number according to the selection of the user to input the same.

21. The method according to claim 20, further comprising providing the characters/numbers displayed in the first display area with a first type of characters/numbers, over which the cursor moves with rotation of a first wheel, and a second type of characters/numbers, over which the cursor moves with rotation of a second wheel.

22. The method according to claim 19, wherein the moving a cursor step comprises:

detecting the rotation of the first wheel, moving the cursor over the characters/numbers corresponding to the first wheel in the first display area, and placing the cursor on a character/number corresponding to a direction and angle of rotation of the first wheel;

detecting the rotation of the second wheel, moving the cursor over the characters/numbers corresponding to the second wheel in the first display area, and placing the cursor on a character/number corresponding to a direction and angle of rotation of the second wheel.

23. The method according to claim 22, further comprising providing characters/numbers corresponding to the first wheel as one of a group of consonants/vowels of an alphabet and a group of characters/numbers frequently used over a number of times during input of a text message.

24. The method according to claim 22, further comprising providing characters/numbers corresponding to the second wheel as one of a group of consonants/vowels of an alphabet and a group of characters/numbers frequently used over a number of times during input of a text message.

* * * * *